(12) United States Patent
Barreto et al.

(10) Patent No.: US 8,789,070 B2
(45) Date of Patent: Jul. 22, 2014

(54) LOCAL DEVICE VIRTUALIZATION

(75) Inventors: Daniel Ernesto Barreto, San Francisco, CA (US); Shishuang Wang, Beijing (CN); Jayadev Marulappa Niranjanmurthy, Karnataka (IN); Sriranga Seetharamaiah, Karnataka (IN)

(73) Assignee: Wyse Technology L.L.C., San Jose, CA (US)

( * ) Notice: Subject to any disclaimer, the term of this patent is extended or adjusted under 35 U.S.C. 154(b) by 1159 days.

(21) Appl. No.: 11/952,071

(22) Filed: Dec. 6, 2007

(65) Prior Publication Data

US 2009/0150909 A1 Jun. 11, 2009

(51) Int. Cl.
*G06F 13/10* (2006.01)

(52) U.S. Cl.
USPC .......................................... 719/324; 719/321

(58) Field of Classification Search
None
See application file for complete search history.

(56) References Cited

U.S. PATENT DOCUMENTS

| | | | | |
|---|---|---|---|---|
| 6,128,679 A * | 10/2000 | Beale et al. | ...................... | 710/62 |
| 6,269,409 B1 * | 7/2001 | Solomon | ....................... | 719/329 |
| 6,895,588 B1 * | 5/2005 | Ruberg | ......................... | 719/321 |
| 7,017,162 B2 | 3/2006 | Smith et al. | | |
| 7,111,106 B2 | 9/2006 | Ohnishi | | |
| 7,222,348 B1 * | 5/2007 | Athreya et al. | ............... | 719/321 |
| 7,269,832 B2 * | 9/2007 | Bodin et al. | .................. | 719/321 |
| 7,349,391 B2 | 3/2008 | Ben-Dor et al. | | |
| 7,412,518 B1 * | 8/2008 | Duigou et al. | ................ | 709/227 |
| 2003/0061401 A1 * | 3/2003 | Luciani, Jr. | ................... | 709/324 |
| 2004/0243883 A1 | 12/2004 | Shankar et al. | | |
| 2004/0255276 A1 | 12/2004 | Rovang | | |
| 2005/0212798 A1 | 9/2005 | Lefebvre et al. | | |
| 2006/0005186 A1 * | 1/2006 | Neil | .................................. | 718/1 |
| 2006/0070090 A1 | 3/2006 | Gulkis | | |
| 2006/0095472 A1 | 5/2006 | Krikorian et al. | | |
| 2006/0281451 A1 | 12/2006 | Zur | | |
| 2007/0005867 A1 | 1/2007 | Diamant | | |
| 2007/0011446 A1 * | 1/2007 | Kato et al. | .................... | 713/150 |
| 2007/0061477 A1 | 3/2007 | Stoyanov et al. | | |

(Continued)

FOREIGN PATENT DOCUMENTS

| | | |
|---|---|---|
| EP | 1 043 876 | 10/2000 |
| EP | 1 681 824 | 7/2006 |

OTHER PUBLICATIONS fabulatech.com/products.html; FabulaTech Products; 3 pages.
fabulatech.com/usb-over-network.html; USB over Network; 4 pages.

(Continued)

*Primary Examiner* — H S Sough
*Assistant Examiner* — Umut Onat
(74) *Attorney, Agent, or Firm* — Baker Botts L.L.P.

(57) ABSTRACT

A system for virtualization of a local device includes a proxy configured to report, to a remote system, a status of a local Universal Serial Bus ("USB") device of the system, and to receive a transaction request designated for the local device from the remote system. The system further includes a generic device driver configured to receive the transaction request for the local device, and to provide a result of the transaction request. The proxy is further configured to provide the result of the transaction request to the remote system. The local device is remote to the remote system, which is configured to include a device-specific driver for the local device. A system for utilizing a local device of a remote system is also provided. The system may include an agent and a virtual bus driver. Methods and machine-readable media are also provided.

49 Claims, 8 Drawing Sheets

(56) References Cited

U.S. PATENT DOCUMENTS

| | | |
|---|---|---|
| 2007/0061814 A1* | 3/2007 | Choi et al. .................... 719/313 |
| 2007/0198674 A1 | 8/2007 | Li et al. |
| 2007/0250863 A1 | 10/2007 | Ferguson |
| 2008/0155132 A1* | 6/2008 | Kato et al. ...................... 710/16 |
| 2008/0168118 A1 | 7/2008 | Hickey et al. |
| 2009/0248802 A1 | 10/2009 | Mahajan et al. |

OTHER PUBLICATIONS support.citrix.com/article/CTX816193; CITRIX Knowledge Center: USB Support in MetaFrame Products; Oct. 8, 2001; May 15, 2007; document ID: CTX816193; 3 pages.

blogs.msdn.com/ts/archive/2006/12/05/terminal-server-plug-and-play-device-redirection-framework-in-vista-and-longhorn-part-1-aspx; Terminal Services Team Blog: Terminal Server Plug and Play Device Redirection Framework in Vista and Longhorn: Part 1.; 4 pages.

Wonhong Kwon et al., "Design and Implementation of Peripheral Sharing Mechanism on Pervasive Computing with Heterogeneous Environment", Software Technologies for Embedded and Ubiquitous Systems [Lecture Notes in Computer Science], May 7, 2007, pp. 537-546, Springer Berlin Heidelberg.

Ciciora, et al., "An Introduction to Teletext and ViewData With Comments on Compatibility", IEEE Transactions on Consumer Electronics, Jul. 1979, pp. 235-245, vol. CE-25, No. 3.

Harden, et al., "TeletextNiewData LSI" IEEE Transactions on Consumer Electronics, Jul. 1979, pp. 353-358, vol. CE-25, No. 3.

Hedger, et al., "Telesoftware: Home Computing Via Broadcast Teletext", IEEE Transactions on Consumer Electronics, Jul. 1979, pp. 279-287, vol. CE-25, No. 3.

Robinson, et al. "Touch-Tone Teletext a Combined Teletext-ViewData System", IEEE Transactions on Consumer Electronics, Jul. 1979, pp. 298-303, vol. CE-25, No. 3.

Communication pusuant to Article 94(3) EPC; European Application No. 08 170 881.0-1954; pp. 5, Jul. 26, 2013.

* cited by examiner

LOCAL DEVICE VIRTUALIZATION

BACKGROUND

1. Field

The subject technology relates generally to remote computing and, in particular, relates to virtualization of a local device.

2. Background

One approach to the design and implementation of computer networks, particularly with regard to the development of client/server applications, includes designing client applications and client devices so that the majority of the heavily used resources are at a remote computing device, such as a centralized server, connected via network. These client devices generally have minimal memory, disk storage, and processor power, but are designed under the premise that most users connected to a powerful server do not need the additional processing power. With these client devices, the total cost of ownership is minimized, because of the reduced resources and because the clients can be centrally administered and updated from the server. As such, these clients are especially suited for a network, which requires a significant number of workstations.

Frequently, devices connected to the server ("server-side devices") are shared amongst a large number of clients. For example, in a data entry facility or in an office environment, multiple clients may periodically use a printer device connected to a server to print documents.

Unfortunately, a device connected to a client ("client-side device") usually cannot be shared with other clients on the network, and the client is generally limited to having exclusive local access to the client-side device. Likewise, in addition to other clients on the network not having access to the client-side device, the server also will have limited, if any, access to the client-side device.

SUMMARY

In accordance with one aspect of the disclosure, a system for virtualization of a local device includes a proxy configured to report, to a remote system, a status of a local device of the system. The proxy is further configured to receive at least one transaction request designated for the local device from the remote system. The system further includes a generic device driver configured to receive the at least one transaction request for the local device. The generic device driver is further configured to provide a result of the at least one transaction request. The generic device driver is operable with the local device and one or more devices other than the local device. The proxy is further configured to provide the result of the at least one transaction request to the remote system. The local device is remote to the remote system. The remote system is configured to comprise a device-specific driver for the local device. The local device may be a Universal Serial Bus ("USB") device.

According to another aspect of the present disclosure, a system for utilizing a local device of a remote system includes a virtual device bus driver configured to receive at least one transaction request. The at least one transaction request is designated for a local device of a remote system. The system further includes an agent configured to receive a notification that the local device is connected to the remote system. The agent is further configured to receive the at least one transaction request. The agent is also configured to provide the at least one transaction request to the remote system. The agent is further configured to receive, from the remote system, a result of the at least one transaction request. The agent is also configured to provide the result of the at least one transaction request. The virtual device bus driver is further configured to receive the result of the at least one transaction request. The system is configured to comprise a device-specific driver specific to the local device. The local device is remote to the system.

According to yet another aspect of the present disclosure, a method is provided for virtualization of a local device. The method includes reporting, to a remote system, a status of a local device of a local system. The method further includes receiving at least one transaction request designated for the local device from the remote system, and communicating the at least one transaction request to the local device. The method also includes receiving a result of the at least one transaction request from the local device, and transmitting the result of the at least one transaction request to the remote system. The local device is remote to the remote system. The remote system is configured to comprise a device-specific driver for the local device.

In another aspect of the disclosure, a method is provided for utilizing a device locally connected to a remote system. The method includes receiving a notification that a device is locally connected to a remote system, and loading, at a system, a device-specific driver for the device locally connected to the remote system. The method further includes accepting at least one transaction request from the device-specific driver. The at least one transaction request is designated for the device locally connected to the remote system. The method also includes providing the at least one transaction request to the remote system, and receiving, from the remote system, a result of the at least one transaction request. The method further includes providing the result of the at least one transaction request to the device-specific driver. The system is remote to the device.

In yet a further aspect of the disclosure, a system for virtualization of a local device includes means for reporting, to a remote system, a status of a local device of a local system. The system also includes means for receiving at least one transaction request designated for the local device from the remote system. The system further includes means for communicating the at least one transaction request to the local device and means for receiving a result of the at least one transaction request from the local device. The system includes means for transmitting the result of the at least one transaction request to the remote system. The local device is remote to the remote system. The remote system is configured to comprise a device-specific driver for the local device.

In yet another aspect of the disclosure, a system for utilizing a device locally connected to a remote system includes means for receiving a notification that a device is locally connected to a remote system. The system also includes means for loading, at a system, a device-specific driver for the device locally connected to the remote system. The system further includes means for accepting at least one transaction request from the device-specific driver. The at least one transaction request is designated for the device locally connected to the remote system. The system includes means for providing the at least one transaction request to the remote system. The system also includes means for receiving, from the remote system, a result of the at least one transaction request, and means for providing the result of the at least one transaction request to the device-specific driver. The system is remote to the device.

In yet a further aspect of the disclosure, a machine-readable medium is encoded with instructions executable by a processor to perform a method for virtualization of a local device.

The instructions include code for reporting, to a remote system, a status of a local device of a local system and code for receiving at least one transaction request designated for the local device from the remote system. The instructions also include code for communicating the at least one transaction request to the local device. The instructions include code for receiving a result of the at least one transaction request from the local device, and transmitting the result of the at least one transaction request to the remote system. The local device is remote to the remote system. The remote system is configured to comprise a device-specific driver for the local device.

In yet a further aspect of the disclosure, a machine-readable medium is encoded with instructions executable by a processor to perform a method for utilizing a device locally connected to a remote system. The instructions include code for receiving a notification that a device is locally connected to a remote system. The instructions also include code for, loading, at a system, a device-specific driver for the device locally connected to the remote system, and accepting at least one transaction request from the device-specific driver. The at least one transaction request is designated for the device locally connected to the remote system. The instructions also include code for providing the at least one transaction request to the remote system. The instructions further include code for receiving, from the remote system, a result of the at least one transaction request, and providing the result of the at least one transaction request to the device-specific driver. The system is remote to the device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
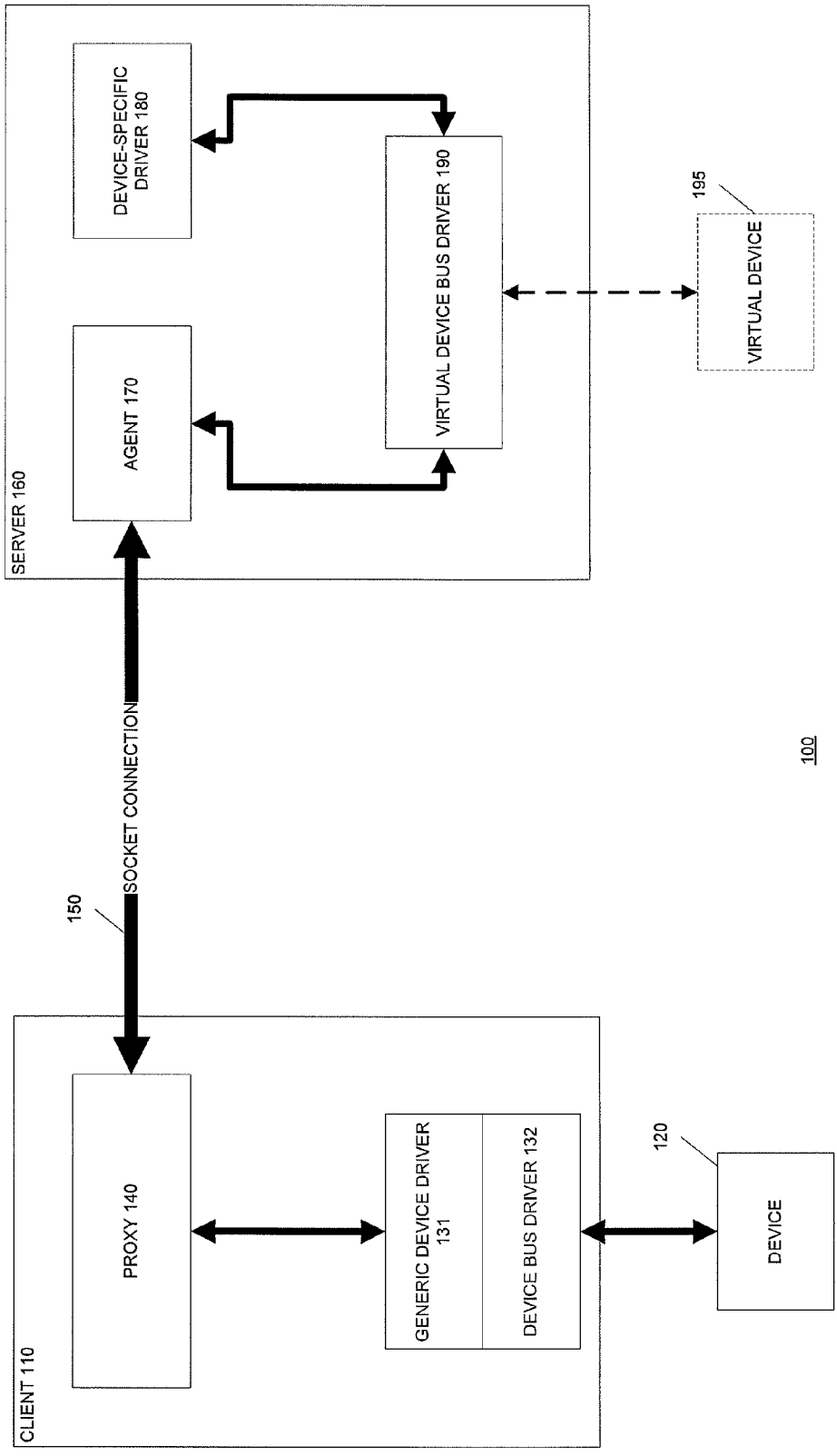
FIG. 1 is a block diagram of a local device virtualization system in accordance with one configuration of the present disclosure.

Now referring to FIG. 1, a simplified diagram of a local device virtualization system is illustrated in accordance with one configuration of the present disclosure. The local device virtualization system 100 may include local client computing device 110 ("client") in communication with remote server computing device 160 ("server") using socket connection 150. Client 110 may include proxy 140, generic device driver 131, and device bus driver 132. Client 110 can be connected to device 120. Server 160 may include agent 170, virtual device bus driver 190, and device-specific driver 180.

According to the illustrated configuration, while device 120 is not locally or physically connected to server 160 and is remote to server 160, device 120 appears to server 160 as if it is locally installed on and connected to server 160. Device 120 thus appears to server 160 as virtual device 195.

By way of illustration and not limitation, device 120 may be a machine-readable storage medium, a keyboard, a joystick, a monitor, a mouse, a camera, a scanner, a printer, a facsimile machine, a phone, a personal digital assistant (PDA), an audio player, a game console, a camcorder, an audio device, a video device, a multimedia device, a mobile pocket personal computer ("PC"), a mobile phone, a peripheral device, or other suitable devices that can be connected to client 110. Device 120 may be a stationary device or a mobile device. Device 120 may be a single interface device or a multiple interface device. Device 120 may be an external device (i.e., external to client 110). In another aspect of the present disclosure, device 120 may be an internal device (i.e., internal to client 110). For example, a keyboard, a monitor or a camera may be internal devices of client 110. Device 120 may be configured for synchronization with server 160.

In one aspect of the disclosure, device 120 is a Universal Serial Bus ("USB") device and can be locally connected to client 110 using a wired USB or wireless USB connection. In another aspect of the disclosure, device 120 may be a device other than a USB device.

Device 120 can be locally connected to client 110 using a wired communications interface including, without limitation, (i) a serial communications interface such as wired USB (discussed above), RS-232, Ethernet, another serial communications interface, or (ii) a parallel communications interface. In another aspect of the present disclosure, device 120 may be locally connected to client 110 using a wireless communications interface, including without limitation, radio frequency ("RF"), infrared, Bluetooth®, wireless USB (discussed above), wireless fidelity (Wi-Fi), Institute for Electrical and Electronic Engineers ("IEEE") 802.11x, or the like.

As used herein, a "local" device of a system, or a device "locally" connected to a system, may be a device directly connected to the system using one or more wires or connectors (e.g., physically connected to the system), a device indirectly connected to the system using one or more hubs, or a device directly connected to the system using a wireless link. For example, device 120 is a local device of client 110. Furthermore, in one aspect of the disclosure, a local device of a system or a device locally connected to a system may include a device within the system (e.g., an internal device of client 110).

A "remote" device, or a device "remote" to a system, may be a device that is not directly connected to the system. For example, server 160 is remote to both client 110 and device 120 because server 160 is not directly connected to client 110 or device 120 but connected indirectly through network 135 (illustrated in FIG. 2), which can include, for example, a router, another server, or the Internet.

Device bus driver 132 can be configured to allow computing programs, such as generic device driver 131, to interact with device 120. Device bus driver 132 may be specific to the operating system of client 110, and thus operable with the operating system of client 110 but not operable with another operating system (e.g., the operating system of server 160 or the operating system of another client). According to another aspect of the disclosure, device bus driver 132 may be compatible with one or more operating systems.

Device bus driver 132 is not specific to device 120. For example, device bus driver 132 can be used for devices that are of a certain type (e.g., devices that utilize the same communications protocol). For instance, device bus driver 132 may be used for a keyboard connected to client 110 utilizing a USB interface and also used for an external storage device connected to client 110 utilizing a USB interface. Device bus driver 132 may be compatible with one or more devices (e.g., device 120 and other devices that utilize the same type of communications protocol).

Device bus driver 132 is specific to a communications protocol. For example, client 110 may be loaded with a device bus driver operable with a USB interface and thus utilizing a USB communications protocol, another separate device bus driver may be loaded to operate with a parallel communications interface and thus utilizing a parallel communications protocol, and yet another separate device bus driver may be loaded to operate with a Bluetooth® interface and thus utilizing a Bluetooth® communications protocol. Thus, device bus driver 132 may be operable with one type of communications protocol but not operable with another type of communications protocol. Accordingly, device bus driver 132 may be operable with one type of devices but not operable with another type of devices that utilizes a different type of communications protocol. According to another aspect of the disclosure, device bus driver 132 may be compatible with one or more communications protocols.

In another aspect of the disclosure, device bus driver 132 may be generic to communications protocols (i.e., one device bus driver is operable with many different types of communications protocols and thus operable with different types of devices).

Device bus driver 132 can identify information regarding device 120 ("device information"), such as features, characteristics, and other information that is specific to device 120. Device bus driver 132 can communicate with device 120 through a computer bus or other wired or wireless communications interfaces, as described above. Device bus driver 132 can be configured to receive transaction requests for device 120 from a computing program, such as generic device driver 131, (e.g., when a routine is called on device bus driver 132 by the computing program), and provide the transaction requests to device 120 (e.g., issue commands to device 120). When device bus driver 132 receives the results of the transaction requests from device 120 (e.g., the executed commands), device bus driver 132 can send the results to the computing program that issued the transaction requests (e.g., the computing program that called the routine).

Generic device driver 131 may be specific to, or compatible with, the operating system of client 110. However, generic device driver 131 is not specific to device 120. Accordingly, generic device driver 131 can be used for, or can be compatible with, various types of devices. Generic device driver 131 can be operable with devices other than device 120, and can be generic to devices. These devices may be peripheral devices of client 110. Generic device driver 131 may also be generic to and compatible with different types of communications protocols (i.e., generic device driver 131 is operable with many different types of communications protocols, such as serial communications protocols, parallel communications protocols, and wireless communications protocols). According to one aspect of the disclosure, if more than one device, such as device 120, is connected to client 110, or if client 110 includes a plurality of data paths, then generic device driver 131 can assign priority depending on different features of device 120 or its data paths, such as an endpoint type (i.e., bulk, control, isochronous, and interrupt). According to another aspect of the disclosure, generic device driver 131 may be compatible with one or more operating systems. According to one aspect of the disclosure, client 110 may have multiple devices and/or multiple generic device drivers. The multiple devices may be the same type or different types of devices, or a combination thereof. For example, all of the devices may be the same type of devices; all of the devices may be different types of devices; or some of the devices are one type of device, and some of the devices are different types of devices. In one aspect, each generic device driver may be associated with, and may operate with, its respective one of the multiple devices. In another aspect, a generic device driver may be associated with, and may operate with, more than one of the multiple devices or all of the multiple devices.

Generic device driver 131 can be configured to receive transaction requests for device 120 (e.g., commands for device 120) from proxy 140 and send the transaction requests to device bus driver 132. Generic device driver 131 can control device 120 and receive the results of the transaction requests (e.g., the executed commands) from device bus driver 132. Generic device driver 131 can also direct those results to server 160 through proxy 140 over socket connection 150.

According to one configuration of the disclosure, neither generic device driver 131 nor device bus driver 132 is specific to device 120, and client 110 does not load a device-specific driver for device 120. Device-specific driver 180 is loaded on one system (e.g., server 160 in this configuration), and not on client 110 or on other clients (e.g., client 185) that wishes to use device 120.

Although generic device driver 131 and device bus driver 132 are illustrated separately, in certain configurations, device bus driver 132 and generic device driver 131 may be combined as a single driver. For example, generic device driver 131 can represent both generic device driver 131 and device bus driver 132.

Proxy 140 can be configured to receive a notification from generic device driver 131 that device 120 is connected to client 110, and to report the notification, along with the device information, to agent 170 running on server 160. The device information can include, for example, one or more of the following: the type of device (i.e., data storage, printer, camera, etc.), its brand, its model designation, and its assigned address. Proxy 140 can be also configured to receive transaction requests over socket connection 150 issued for device 120 (e.g., commands for device 120) from the server-side (e.g., agent 170) and provide those requests to generic device driver 131 for ensuing execution on device 120. Proxy 140 can be also configured to receive results of the transaction requests (e.g., the executed commands), if any exists, and provide those results over socket connection 150 to the server-side (e.g., agent 170).

According to one aspect of the disclosure, (i) proxy 140 along with generic device driver 131, (ii) proxy 140, or (iii) generic device driver 131 may translate the transaction requests from a form compatible with the operating system of server 160 into a form compatible with the operating system of client 110. Device bus driver 132 and device 120 may receive the transaction requests in a form compatible with, or understandable by, the operating system of client 110.

In one aspect of the disclosure, (i) proxy 140 along with generic device driver 131, (ii) proxy 140, or (iii) generic device driver 131 may, if necessary, translate the results of the transaction requests received, from device 120 through device bus driver 132, from a form compatible with the operating system of client 110 into a form compatible with the operating system of server 160. In one aspect of the disclosure, client 110 receive information about the operating system running on server 160.

According to one aspect of the disclosure, server 160 is independent of the type of operating system running on client 110. In this regard, server 160 can operate without knowing the type of operating system running on client 110 and without receiving information about the operating system of client 110.

In one aspect of the disclosure, proxy 140 may be generally a module that performs a function or operation on behalf of generic device driver 131 and/or device bus driver 132, and communicates with server 160, while not disclosing the details of the function or operation to server 160, or may be a module that performs a task in the background.

Agent 170 can be configured to receive the notification from proxy 140 that device 120 is connected to client 110 and the device information. Agent 170 can provide the notification and device information to virtual device bus driver 190. Agent 170 can also receive, from virtual device bus driver 190, transaction requests issued for device 120 (e.g., commands for device 120) and send those requests to proxy 140 over socket connection 150. Agent 170 can also receive the results of those requests (if any) over socket connection 150 and send them to virtual device bus driver 190.

In one aspect of the disclosure, agent 170 may be generally a module that performs a function or operation on behalf of virtual device bus driver 190 and/or device-specific driver 180, and communicates with client 110, while not disclosing the details of the function or operation to client 110, or may be a module that performs a task in the background.

Virtual device bus driver 190 can be configured to report to the operating system of server 160 that device 120 is connected and provide the device information for device 120 to the operating system, so that the operating system can load device-specific driver 180 for device 120. According to one configuration, device-specific driver 180 is operating system specific (e.g., operable or compatible with one type of operating system). Device-specific driver 180 may be specific and compatible with the operating system of server 160. Virtual device bus driver 190 can be further configured to intercept from device-specific driver 180 transaction requests designated for device 120 (e.g., device-understandable commands), send the transaction requests to agent 170, and wait to receive from agent 170 any results of the transaction requests. Upon receiving the results, virtual device bus driver 190 can provide the results to device-specific driver 180. Virtual device bus driver may also accept transaction request from device-specific drivers other than device-specific driver 180.

Advantageously, because device-specific driver 180 resides in server 160 (and not in client 110) and is configured for usage with the operating system of server 160 (and not with the operating system of client 110), while device bus driver 132 resides in client 110 and is configured for use with the operating system of client 110, the local device virtualization system as described herein is capable of usage not only with homogeneous operating systems, but also with heterogeneous operating systems (i.e., the operating systems of client 110 and server 160 do not have to be the same).

Furthermore, since only one instance of the device-specific driver 180 is present in the device virtualization system, regardless of the number of clients which use virtual device 195 centrally accessible through server 160, only the single device-specific driver 180 needs to be updated or reconfigured if necessary, thus obviating the need to update an instance of a device-specific driver for each and every client.

In one aspect of the disclosure, client 110 may install a device-specific driver for device 120 locally so that when client 110 is not connected to server 160 (in which case device-specific driver 180 on server 160 is not available to client 110), client 110 can still utilize local device 120 via the local device-specific driver on client 110. In another aspect, when a user of a client wishes to use device 120 through server 160 (e.g., printing a document to device 120 utilizing an application on server 160), the local device-specific driver of client 110 is not utilized. Instead, device-specific driver 180 on server 160 is utilized.

Figure 2:
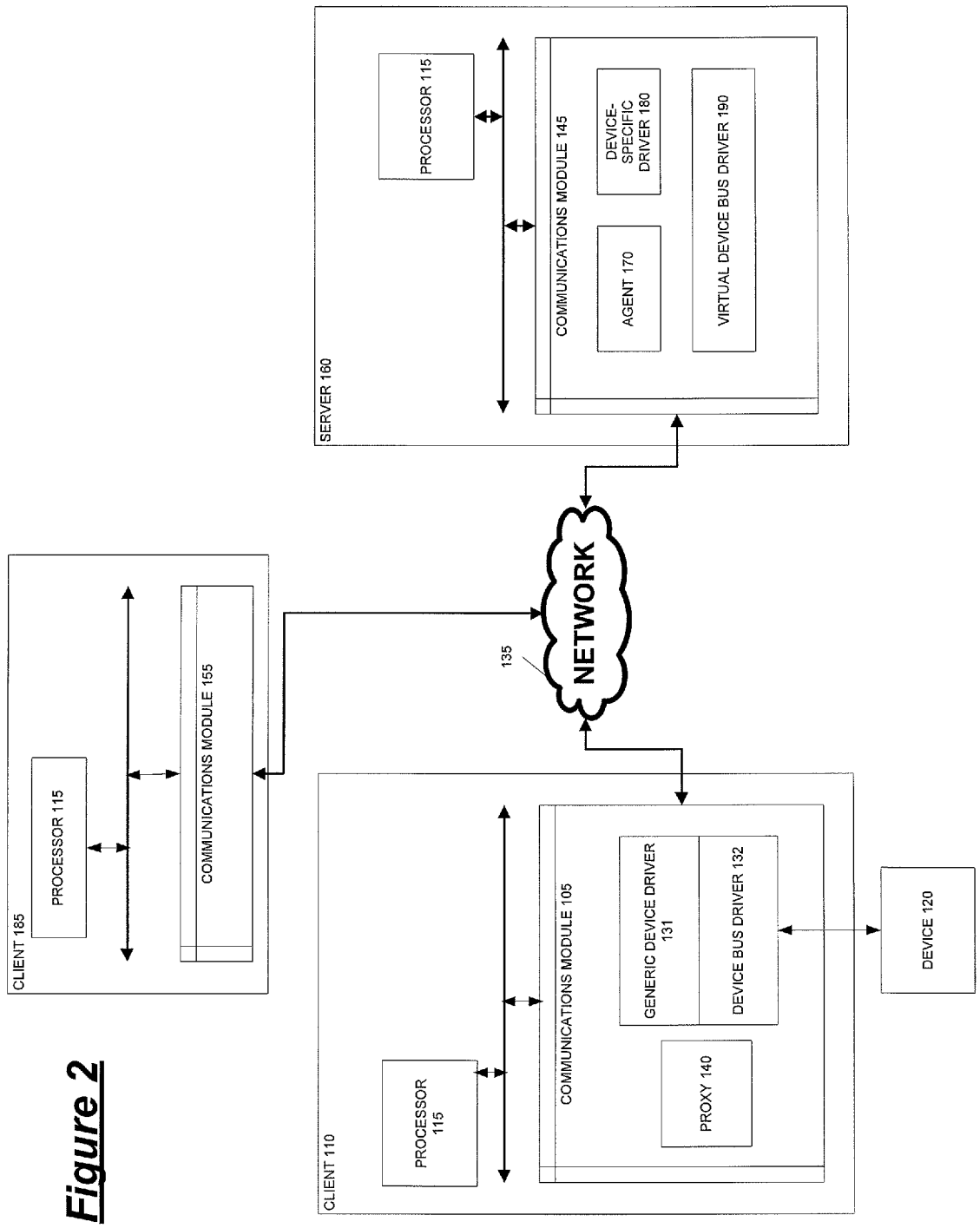
FIG. 2 is a block diagram illustrating an exemplary hardware configuration of a local device virtualization system.

Now referring to FIG. 2, a conceptual block diagram is shown illustrating an exemplary hardware configuration for the local device virtualization system of FIG. 1. While client 110 and server 160 correspond to the similarly named and numbered client and server of FIG. 1, client 185 of FIG. 2 is another client system which, when connected to server 160, can gain access to device 120 through server 160. For example, according to one aspect of the disclosure, client 185 can gain access to device 120 through server 160 when the operating system of server 160 is Windows 2003 Terminal Server®.

Each of clients 110 and 185 can represent a computer, a laptop computer, a thin client, a PDA, a portable computing device, or a suitable device with a processor. According to one aspect of the disclosure, when a client is a thin client, it may be a device having at least a processor and memory, where the total amount of memory of the thin client is less than the total amount of memory in server 160. A thin client may not have a hard disk. In certain configurations, each of clients 110 and 185 can represent a mobile telephone, an audio player, a game console, a camera, a camcorder, an audio device, a video device, a multimedia device, or a device capable of supporting a connection to remote server 160. Clients 110 and 185 can be stationary or mobile.

Server 160 may represent a computer, a laptop computer, a thin client, a PDA, a portable computing device, a virtual machine (e.g. VMWare® Virtual Machine), or a suitable device with a processor. In certain configurations, server 160 can represent a mobile telephone, an audio player, a game console, a camera, a camcorder, an audio device, a video device, a multimedia device, or a device capable of supporting a connection to remote server 160. Server 160 can be stationary or mobile.

A processor such as processor 115, illustrated as part of clients 110 and 185 and server 160, may be implemented using software, hardware, or a combination of both. By way of example and not limitation, a processor may be implemented with one or more processors. A processor may be a general-purpose microprocessor, a microcontroller, a digital signal processor ("DSP"), an application specific integrated circuit ("ASIC"), a field programmable gate array ("FPGA"), a programmable logic device ("PLD"), a controller, a state machine, gated logic, discrete hardware components, or any other suitable device that can perform calculations or other manipulations of information. A processor may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a random access memory ("RAM"), a flash memory, a read only memory ("ROM"), a programmable read-only memory ("PROM"), an erasable PROM ("EPROM"), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for a processor. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by clients 110 and 185, by server 160 or by processor 115. Instructions can be, for example, a computer program including code. A machine-readable medium may comprise one or more media.

Communications modules 105, 155, and 145, illustrated as part of clients 110 and 185 and server 160, may be implemented using software, hardware, or a combination of both. By way of example, communications modules 105, 155, and 145 may be implemented with one or more communications devices, such as, but not limited to, a modem, RS-232, Ethernet, Wi-Fi, IEEE 802.11x, or other forms of communication.

Communications modules 105, 155, and 145 may also include one or more machine-readable media for storing software. Communications module 105 of client 110 includes previously described proxy 140, generic device driver 131, and device bus driver 132, each of which may have direct access to its respective processor 115. Likewise, communications module 145 of server 160 includes previously described agent 170, device-specific driver 180, and virtual device bus driver 190, each of which may have direct access to its respective processor 115. Device 120 is connected locally to client 110, as described above.

Each of communications modules 105, 155, and 145 is also configured for communicating with the other illustrated devices over network 135. Communications modules 105, 155, and 145 can be connected to network 135, for example, via a modem connection, a local-area network ("LAN") connection including the Ethernet, or a broadband wide-area network ("WAN") connection including digital subscriber line ("DSL"), Cable, T1, T3, Fiber Optics, and Satellite connection. Network 135 can be a LAN network, a corporate WAN network, or the Internet, and may include features such as a firewall.

Communications modules 105, 155, and 145 may be configured to communicate information for their respective devices, clients 110, 185, and server 160. The functionality of the communications modules 105, 155, and 145 for one configuration of a local device virtualization system is illustrated in FIG. 2, but those skilled in the art will readily appreciate that other configurations may include a communications module that has the same or different functionality. Communications module 155 may include one or more blocks included in communications module 105.

Figure 3:
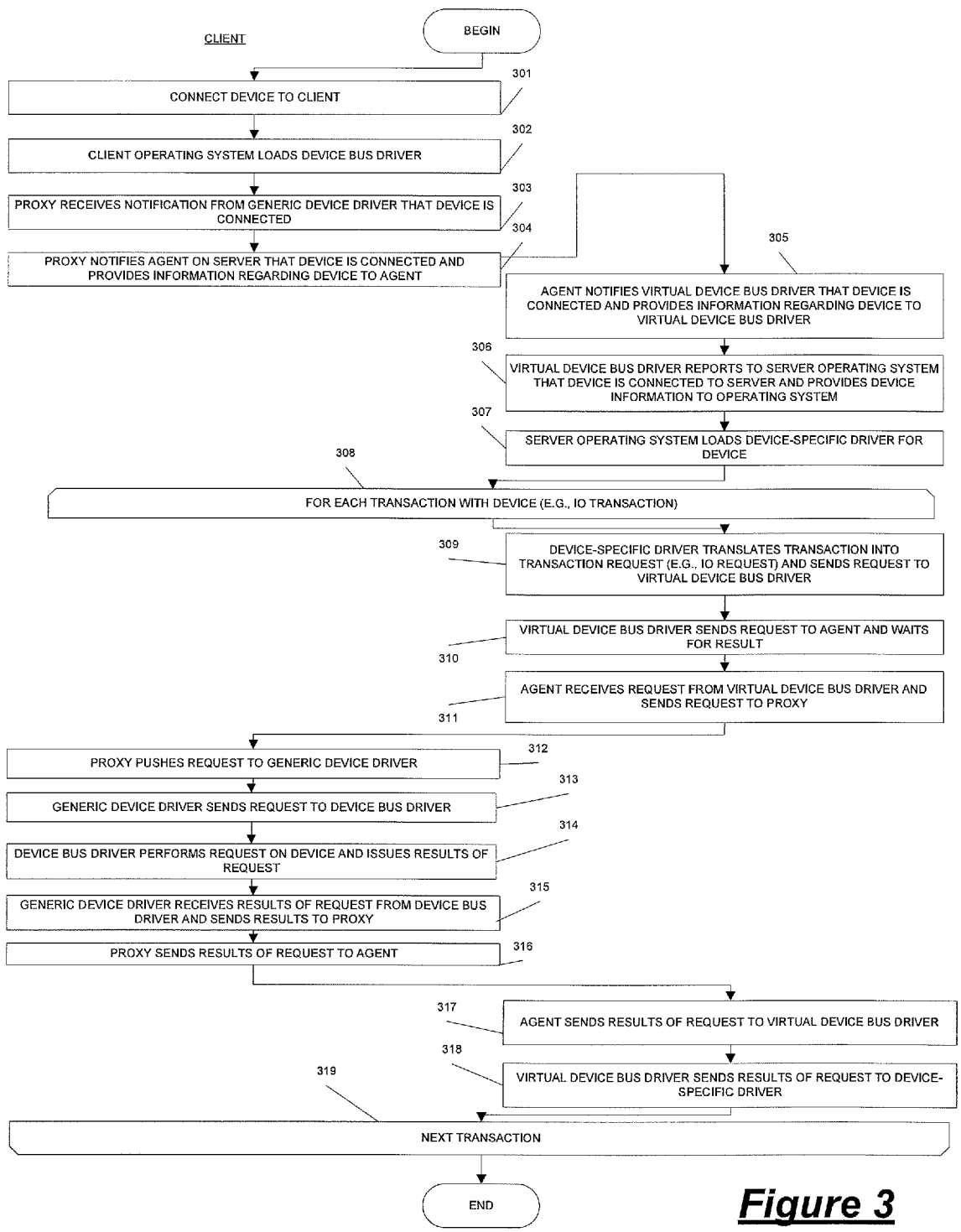
FIG. 3 is a flow chart depicting an exemplary process of virtualizing a local device from a local computing device to a remote computing device.

FIG. 3 is a flowchart illustrating an exemplary method of virtualizing a local device from a local computing device (e.g., client 110) to a remote computing device (e.g., server 160). The instructions for this method may be embodied in a machine-readable medium according to one aspect of the present disclosure. The method may include the following steps.

The first set of steps, steps 301-304, occur on the client side. In step 301, device 120 is connected to client 110. The connection can be a physical or wired connection, or the connection can be wireless, as described above. In step 302, the client operating system loads device bus driver 132. In step 303, generic device driver 131 notifies proxy 140 that device 120 is connected. Prior to step 303, generic device driver 131 can itself be notified of the connection by either monitoring the client operating system or other portions of client 110, or by registering with the client operating system or other applications to receive a notification when device 120 is connected. In step 304, proxy 140 subsequently notifies server-side agent 170 over socket connection 150 that device 120 is connected to client 110, and further provides device information to agent 170. Socket connection 150 is established over network 135.

Steps 305-311 are performed on the server side. In step 305, agent 170 notifies virtual device bus driver 190 that device 120 is connected to client 110 and provides the device information received from proxy 140 to virtual device bus driver 190. In step 306, virtual device bus driver 190 reports to the server operating system that device 120 is connected to client 110 and provides the device information to the server operating system. Device 120 appears as virtual device 195 to server 160. In step 307, the server operating system loads device-specific driver 180 intended for virtual device 195, but instead used for device 120. It should be noted that step 307 may be performed prior to any of steps 301 through 306. In certain configurations, device-specific driver 180 may be a driver that is specific to, or is compatible with, a software application, such as an image application for a camera, a fax application for a scanner, or a word processor application for a printer. In another configuration, a device-specific driver may be incorporated into a software application.

A loop then begins at step 308, such that the loop steps 309 to 318 occur for each transaction (e.g., a routine) designated for device 120 (or virtual device 195). According to one aspect of the disclosure, a transaction request (e.g., a command) may be issued or originated by higher-level computer programs on server 120. A higher-level computer program as discussed with reference to FIG. 3 can be any application that has permission to issue a command or other request to device-specific driver 180. For example, a higher-level computer program can include the server operating system or applications running within the server operating system, such as document editing software. Exemplary transactions initiated by higher-level computer programs can include, for example, a print request from server side document editing software to be printed by device 120 (e.g., an external printer), a read or write request from the server side operating system to read information from or write information to device 120 (e.g., an external data storage device), or a request to maintain an open channel to listen for a key-press from device 120 (e.g., an external keyboard device).

In step 309, device-specific driver 180, which is configured to translate, or parse, the transactions to transaction requests understandable by device 120 (e.g., device-understandable commands), issues a transaction request to virtual device bus driver 190 for device 120 (corresponding to virtual device 195).

In step 310, virtual device bus driver 190 sends the transaction request to agent 170 to send to client 110, and waits for the result, if any, of the transaction request to return from the client side. In step 311, agent 170 receives the transaction request from virtual device bus driver 190 and sends it to proxy 140 on client 110 over socket connection 150.

Steps 312-316 are performed on the client side. In step 312, proxy 140 pushes the transaction request received from agent 170 on server 160 to generic device driver 131. According to one aspect of the disclosure, proxy 140, generic device driver 131, or proxy 140 and generic device driver 131 translate the transaction request into a form compatible with the operating system of client 110. In step 313, generic device driver 131 sends the transaction request to device bus driver 132, which then in step 314 performs the transaction request on device 120 and issues the results of the request (if any) to generic device driver 131. If any results exist, then the method proceeds to steps 315-318, otherwise, the method can jump to step 319. In step 315, generic device driver 131 receives from device bus driver 132 the results of the transaction request and sends the results to proxy 140, and in step 316 proxy 140 sends the results over socket connection 150 to agent 170 on server 160. In one aspect, proxy 140, generic device driver 131, or proxy 140 and generic device driver 131 may translate the results of the transaction request into a form compatible with the operating system of server 160.

Steps 317-318 occur on the server side. In step 317, agent 170 sends the results of the transaction request to virtual device bus driver 190, which has been waiting for the results since step 310, and, in step 318, virtual device bus driver 190 sends the results of the transaction request issued by device-specific driver 180 in step 309 to device-specific driver 180. Device-specific driver 180 is accordingly unaware that its original transaction request issued in step 309 was sent to client 110, which is remote to server 160, nor does it know that the results of its transaction request have been received from device 120 locally connected to remote client 110.

In step 319, the method determines if any transactions for device 120 remain. If such transactions do remain, the method returns to step 308, but if no such transactions remain, the method ends.

Figure 4:
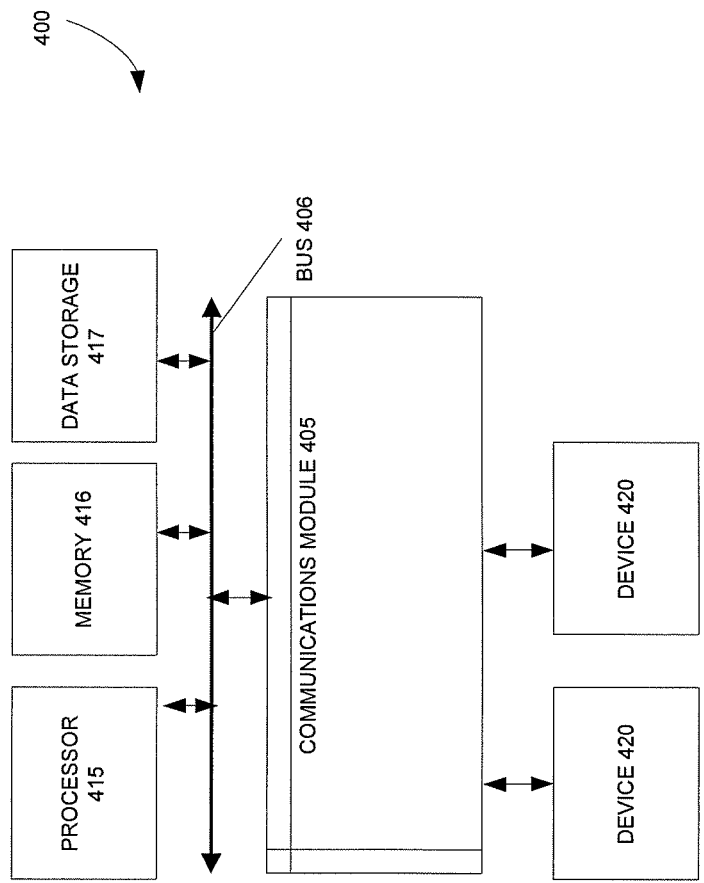
FIG. 4 is a block diagram that illustrates an exemplary computing system that can perform certain aspects of the present disclosure in accordance with one configuration of the present disclosure.

FIG. 4 is an exemplary block diagram that illustrates a computing system 400 that can perform an aspect of the present disclosure. Computing system 400 may represent any one or more of clients 110 and 185 and server 160. The computing system 400 may include communications module 405 for communicating information, bus 406 for communicating information between different modules, and processor 415 coupled with the communications module 405 for processing information. Communications module 405 may represent communications module 105, 115 or 145 (see FIG. 2). Processor 415 may represent processor 115 (see FIG. 2).

Computing system 400 may also be coupled to one device 420 or a plurality of devices 420. Devices 420 may include same devices, similar devices or different devices. One or more devices 420 may represent one or more devices 120 (see FIG. 2). Computing system may 400 further include memory 416, such as a RAM, a ROM or other memory device, coupled to bus 406, for storing information and instructions to be executed by processor 415. Memory 416 may also be used for storing temporary variable or other intermediate information during execution of instructions to be executed by processor 415. Computing system 400 may further include data storage device 417, such as a magnetic disk or optical disk, coupled to bus 406 for storing information and instructions. The operating system(s) as discussed herein, may reside wholly or in part, in memory 416 and/or data storage 417, and may be executed by processor 415. According to one configuration, computing system 400 functioning as a client may not have data storage 417. According to another configuration, computing system 400 functioning as a client may have data storage 417.

Now referring back to FIGS. 1 and 2, exemplary operating systems that are compatible with a local device virtualization system include, but are not limited to, various versions and flavors of Windows Vistas, Windows XP®, Windows 2000 Server®, Windows Server 2003®, Windows NT®, Windows Me®, Windows 98®, Windows CE®, Windows XPe®, PocketPC®, Wyse Thin operating system ("WTOS"), Wyse Linux, Unix® systems, and Linux®.

According to one configuration, server 160 may utilize, for example, any one of the following operating systems: a version of Windows Vista®, Windows XP®, Windows 2000®, Windows 2003®, or any other operating system. Server 160 may run any one of the following: Microsoft® Terminal Services, Citrix® Presentation server, Windows XP®, or Windows Vista®.

According to one configuration, each of clients 110 and 185 may utilize, for example, any one of the following operating systems: a version of Wyse Thin OS, Wyse Linux, Linux®, Windows CE® (including Windows CE® 5.0 and Windows CE® 6.0), Windows XP®, Windows XPe®, PocketPC®, or any other operating system. Each of clients 110 and 185 may use different class thin computing platforms, such as platforms that differ in their levels of scalability, flexibility, and expense. In another configuration, each of clients 110 and 185 may use the same class thin computing platforms.

User experience is that of a regular PC with plug and play for each device 120. Thus, when device 120 is moved from one port of client 110 to another, a new physical device object can be created, and the user experience is the same as it would be with a regular PC. When client 110 is not connected to server 160, device 120 is not available to server 160. Clients 110 and 185 may use, for example, a Microsoft® Remote Desktop Protocol application or a Citrix® Independent Computing Architecture application to connect to server 160. In one aspect of the disclosure, no additional validations are needed for device 120. Validation can be done, for example, using a group policy object, which can detail the specific model of device 120 and the driver required for device 120. Server 160 may restrict a client or a group of clients from accessing device 120 (corresponding to virtual device 195) or other devices. Server 160 may utilize group policy objects, a standard Microsoft® utility or other utilities to prevent the access.

A driver specific to, or compatible with, device 120 can be installed on server 160 as device-specific driver 180, either before or after device 120 is connected to client 110. If server 160 does not have a driver specific to, or compatible with, device 120 (i.e., if a device-specific driver 180 for device 120 matching the device information identified by device bus driver 132 is not present) when device 120 is connected to client 110, then server 160 can present a message to a user that device 120 is not recognized by server 160. In one aspect of the disclosure, server 160 does not need additional validations to present this message. The server operating system may automatically attempt to locate and load an appropriate device-specific driver based on the device information, such as by searching the Internet through network 135. Similarly, other components, such as generic device driver 131, proxy 140, agent 170, and virtual device bus driver 190, may already exist on their respective client and server systems, or they may be added to their respective systems at a later time.

Figure 5:
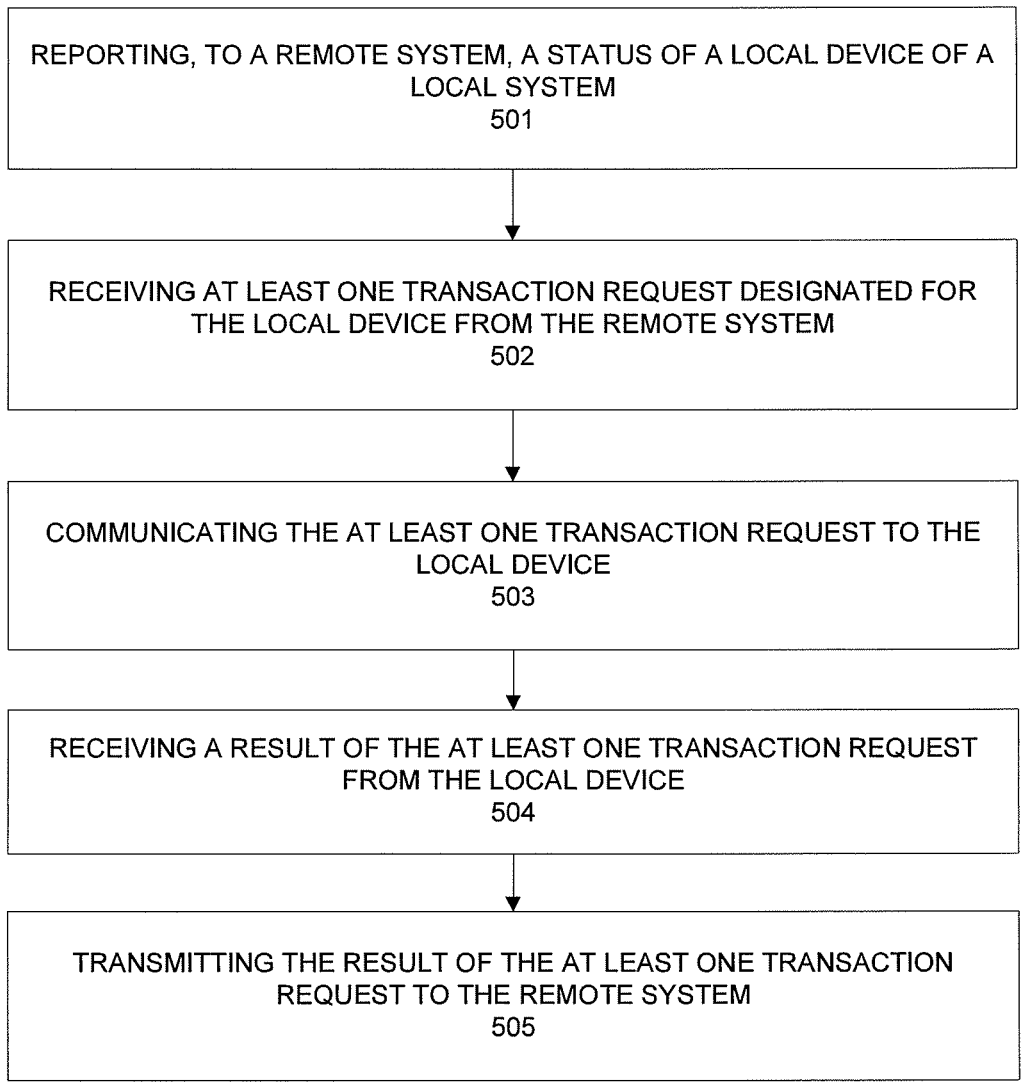
FIG. 5 is a flow chart illustrating an exemplary operation of virtualizing a local device.

FIG. 5 is a flow chart illustrating an exemplary operation of virtualizing a local device. In step 501, a module (e.g., proxy 140) reports, to a remote system (e.g., server 160), a status of a local device (e.g., device 120) of a local system (e.g., client 110). The local device is remote to the remote system. In step 502, the module receives at least one transaction request designated for the local device from the remote system. In step 503, the at least one transaction request is communicated to the local device. In step 504, a result of the at least one transaction request is received from the local device. In step 505, the result of the at least one transaction request is transmitted to the remote system. The remote system may be configured to comprise a device-specific driver for the local device. The local system may be configured with, or configured for, a first operating system, and the remote system may be configured with, or configured for, a second operating system. A machine-readable medium may be encoded with instructions executable by a processor to perform a method for virtualization of a local device described above.

Figure 6:
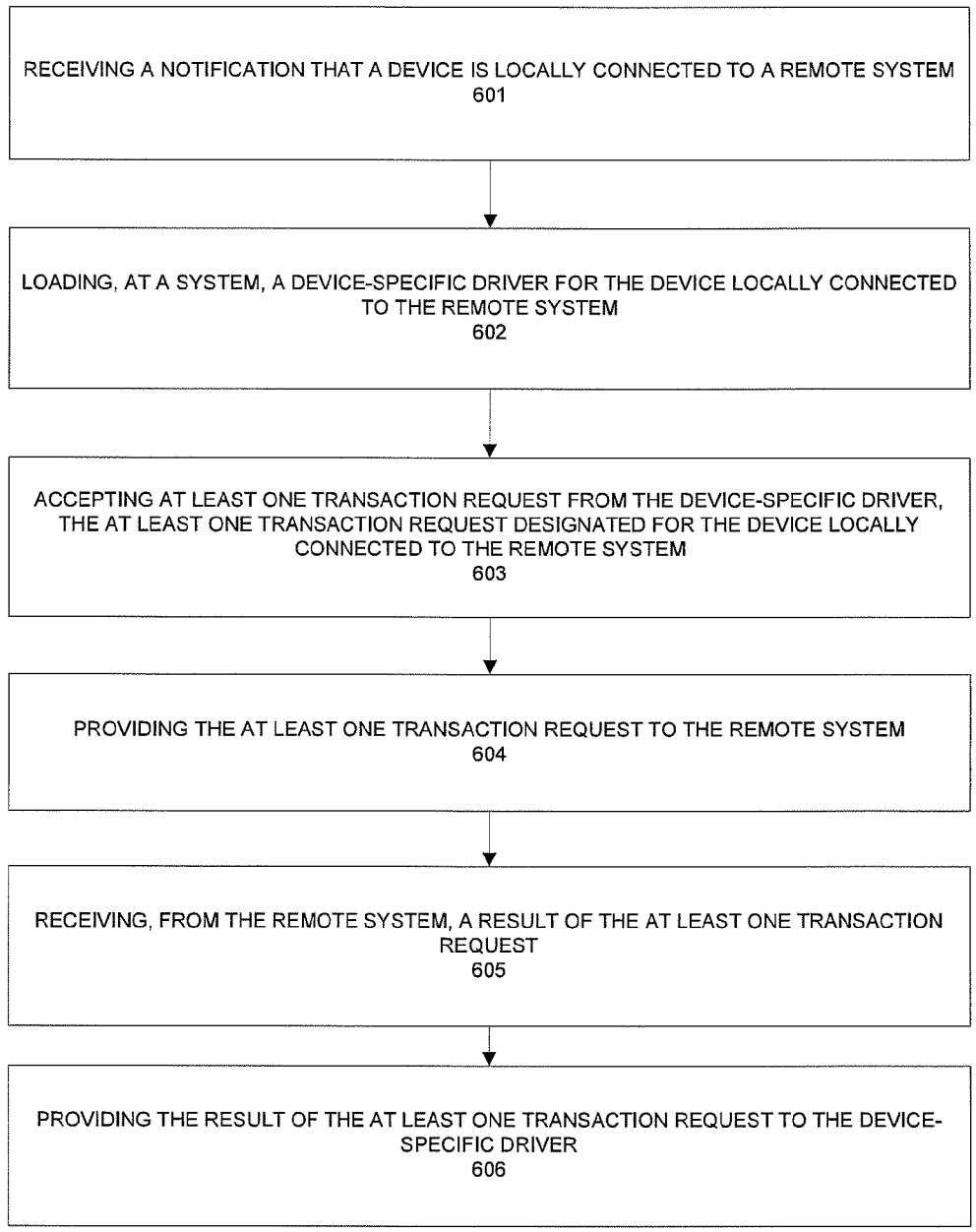
FIG. 6 is a flow chart illustrating an exemplary operation of utilizing a device locally connected to a remote system.

FIG. 6 is a flow chart illustrating an exemplary operation of utilizing a device locally connected to a remote system. In step 601, a module (e.g., agent 170) receives a notification that a device (e.g., device 120) is locally connected to a remote system (e.g., client 110). In step 602, a device-specific driver (e.g., device-specific driver 180) for the device locally connected to the remote system is loaded at a system (e.g., server 160). The system is remote to the device. In step 603, at least one transaction request is accepted from the device-specific driver, where the at least one transaction request is designated for the device locally connected to the remote system. In step 604, the at least one transaction request is provided to the remote system. In step 605, a result of the at least one transaction request is received from the remote system. In step 606, the result of the at least one transaction request is provided to the device-specific driver. A machine-readable medium may be encoded with instructions executable by a processor to perform a method for utilizing a device locally connected to a remote system, as described above.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Figure 7:
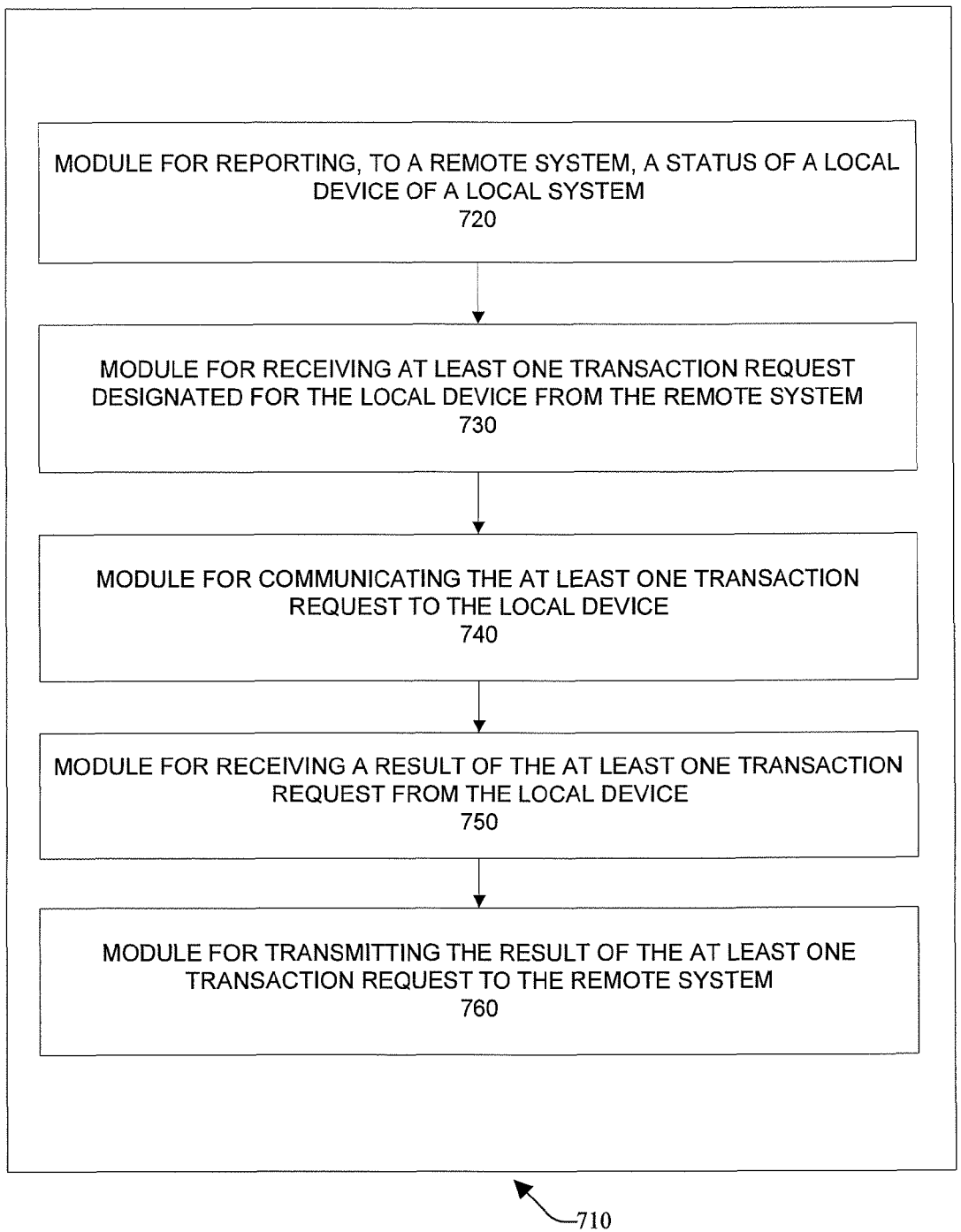
FIG. 7 is a conceptual block diagram illustrating an example of the functionality of modules in a system for virtualization of a local device.

FIG. 7 is a conceptual block diagram illustrating an example of the functionality of modules in a system 710 (e.g., client 110). In this example, system 710 comprises a module 720 for reporting, to a remote system, a status of a local device of a local system. The local device is remote to the remote system. Client 710 further comprises a module 730 for receiving at least one transaction request designated for the local device from the remote system, a module 740 for communicating the at least one transaction request to the local device, a module 750 for receiving a result of the at least one transaction request from the local device, and a module 760 for transmitting the result of the at least one transaction request to the remote system. The remote system is configured to comprise a device-specific driver for the local device. The local system may be configured with, or configured for, a first operating system, and the remote system may be configured with, or configured for, a second operating system.

In system 710, the local device can be a Universal Serial Bus device. In system 710, the system can be configured with, or configured for, a first operating system, and the remote system can be configured with, or configured for, a second operating system, where the first operating system is different than the second operating system. In this case, system 710 can further include a module for translating the at least one transaction request from a form compatible with the second operating system into a form that is compatible with the first operating system. In system 710, the local system does not comprise a device-specific driver for the local device. The system 710 can further include a module for receiving the at least one transaction request for the local device from a generic device driver, and a module for providing the result of the at least one transaction to the generic device driver, where the generic device driver is configured to provide the result of the at least one transaction to the means for transmitting. In system 710, the module for communicating the at least one transaction request to the local device can include a generic device driver, a device bus driver, or both of the generic device driver and the device bus driver, and the device bus driver can be operable with a first operating system and not operable with a second operating system, the device bus driver can be operable with a first type of communications protocol and not operable with a second type of communications protocol, the device bus driver can be operable with the local device and operable with a second local device, and the local device and the second local device can utilize one type of communications protocol, where the generic device driver can be operable with the first operating system and not operable with a second operating system, and the generic device driver can be operable with different types of communications protocol.

In system 710, the module for reporting can include a proxy, and the module for receiving a result of the at least one transaction request from the local device can include a device bus driver, and the system can further include a module for receiving, from the proxy, the at least one transaction request, a module for controlling the local device, a module for receiving the result of the at least one transaction request from the device bus driver, and a module for providing the result of the at least one transaction request to the proxy. In system 710, the status of the local device can include whether the local device is connected to the local system. In system 710, the status of the local device can include identifying information about the local device. In system 710, the local system can be a computer comprising a processor, and the remote system can include a virtual device bus driver, an agent and a processor.

Figure 8:
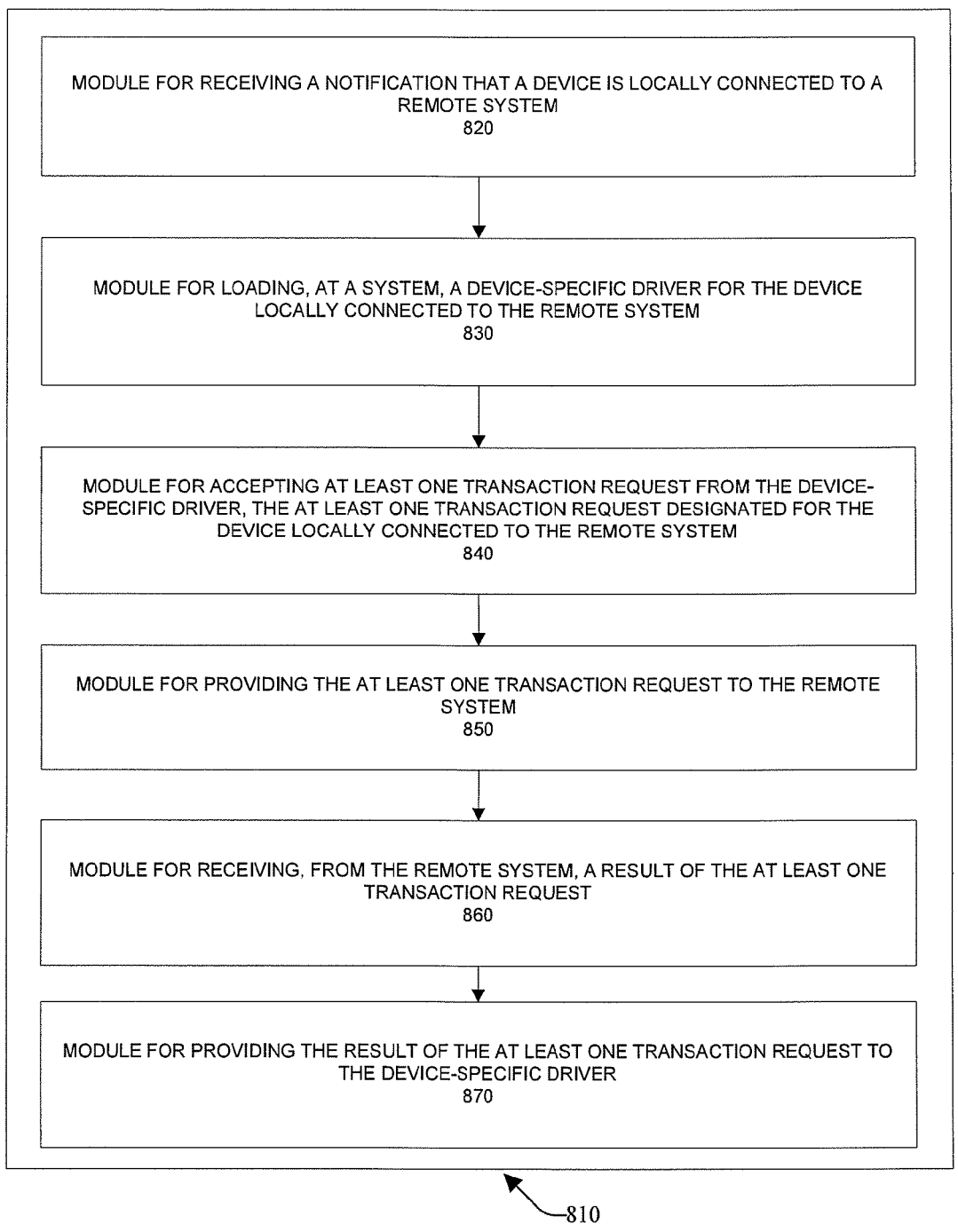
FIG. 8 is a conceptual block diagram illustrating an example of the functionality of modules in a system for utilizing a device locally connected to a remote system.

FIG. 8 is a conceptual block diagram illustrating an example of the functionality of modules in a system 810 (e.g., server 160). In this example, system 810 comprises a module 820 for receiving a notification that a device is locally connected to a remote system. System 810 further comprises a module 830 for loading, at a system, a device-specific driver for the device locally connected to the remote system, a module 840 for accepting at least one transaction request from the device-specific driver, the at least one transaction request designated for the device locally connected to the remote system. System 810 also comprises a module 850 for providing the at least one transaction request to the remote system, a module 860 for receiving, from the remote system, a result of the at least one transaction request, and a module 870 for providing the result of the at least one transaction request to the device-specific driver. The system is remote to the device.

In system 810, the device can be a Universal Serial Bus device. In system 810, the remote system can be configured with, or configured for, a first operating system, and the system can be configured with, or configured for, a different operating system. In system 810, the at least one transaction request can be configured to be translated from a form compatible with the second operating system into a form that can be compatible with the first operating system. In system 810, the module for accepting at least one transaction request from the device-specific driver can be a virtual device bus driver, the virtual device bus driver configured to accept transaction requests from other device-specific drivers. System 810 can further include a module for receiving identifying information about the local device from the remote system. In system 810, the module for loading a device-specific driver for the device locally connected to the remote system can be based on the identifying information about the local device.

In system 810, the module for receiving a notification that a device can be locally connected to a remote system includes an agent, and system 810 can further include a module for receiving the notification from the agent, a module for providing the notification to an operating system of the system, a module for receiving the at least one transaction request from the device-specific driver, a module for receiving the result of the at least one transaction request from the agent, a module for providing the result of the at least one transaction request to the device-specific driver, and the agent can be configured to receive the at least one transaction request from the module for receiving the at least one transaction request from the device-specific driver. In system 810, the device-specific driver can be configured to translate a transaction with the local device to a transaction request understandable by the local device.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

Various modules and blocks may be arranged differently (e.g., arranged in a different order, or partitioned in a different way) all without departing from the scope of the subject technology. For example, various blocks in a communications module may be implemented in one or more different modules. A communications module, a processor and a memory may be arranged differently. For instance, a proxy, an agent, and a driver may be stored in a memory or data storage and/or executed by a processor. A processor may include a memory. Furthermore, when information is discussed as being received, notified or accepted from/by a module or sent, issued, notified, transmitted, reported, provided or pushed to/from a module, it is understood that the information may be received, notified or accepted from/by the module or sent, issued, notified, transmitted, reported, provided or pushed to/from the module either directly or indirectly. Furthermore, in one aspect of the disclosure, information such as a transaction request, a result of a transaction request and/or device information may be encrypted. In another aspect, information may be unencrypted. It is understood that information may be received, notified or accepted from/by a module or sent, issued, notified, transmitted, reported, provided or pushed to/from a module in either encrypted or unencrypted form. Furthermore, a local device virtualization system is not limited to a server-client architecture. For example, client 110 may be a server and server 160 may be a client; both client 110 and server 160 may be servers; and both client 110 and server 160 may be clients. Client 110 and server 160 may represent other architectures.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A computing device for virtualization of a Universal Serial Bus ("USB") device when the USB device is physically coupled to the computing device, comprising:
    a processor;
    a memory coupled to the processor, the memory storing computer-executable instructions, the instructions when executed by the processor, including instructions to execute at least a portion of a first operating system;
    a proxy to:
        report a status of the USB device to a remote system, wherein the remote system is accessible to the computing device using a socket connection and is executing a second operating system different from the first operating system;
        receive, from the remote system, a transaction request designated for the USB device in a second form compatible with the second operating system, wherein the transaction request corresponds to a command for the USB device;
        translate the transaction request from the second form into a first form compatible with the first operating system;

receive a result of the transaction request in the first
form, wherein the result corresponds to an executed
command for the USB device;
translate the result of the transaction request from the
first form into the second form; and
provide the translated result in the second form to the
remote system; and
a generic device driver to:
operate with different USB devices including the USB
device;
assign priorities to the different USB devices based on
data paths;
receive the translated transaction request for the USB
device from the proxy;
control the USB device;
receive the result of the transaction request in the first
form from a device bus driver; and
provide the result of the transaction request in the first
form to the proxy; and
wherein the generic device driver is native to the first operating system, and
wherein the remote system comprises a device-specific
driver for the USB device.

2. The computing device of claim 1, wherein the computing device translating the result includes at least one of the proxy and the generic device driver translating the result.

3. The computing device of claim 1, further comprising the device bus driver to:
receive the transaction request from the generic device driver;
provide the transaction request to the USB device;
receive the result from the USB device; and
provide the result to the generic device driver.

4. The computing device of claim 1, wherein the device bus driver:
is operable with the first operating system and not operable with the second operating system; and
is operable with a first type of communications protocol wherein the USB device and a second local device utilize the first type of communications protocol,
wherein the generic device driver is operable with the first operating system and not operable with the second operating system.

5. The computing device of claim 1, wherein the status of the USB device includes whether the local USB device is connected to the computing device.

6. The computing device of claim 1, wherein the status of the USB device includes identifying information about the USB device.

7. The computing device of claim 1, wherein the remote system comprises a virtual device bus driver, an agent, and a processor.

8. The computing device of claim 1, wherein at least one of the transaction request and the result is encrypted.

9. A computing device for utilizing a Universal Serial Bus ("USB") device when the USB device is physically coupled to a remote system, comprising:
a processor;
a memory coupled to the processor, the memory storing computer-executable instructions, the instructions when executed by the processor, including instructions to execute at least a portion of a first operating system;
a virtual device bus driver to:
receive a transaction request, the transaction request designated for the USB device at the remote system, the transaction request corresponding to a command for the USB device; and
receive a result of the transaction request corresponding
to an executed command of the USB device;
an agent to:
receive a notification that the USB device is connected to
the remote system;
receive the transaction request;
forward the transaction request to the remote system;
receive, from the remote system, a result of the transaction request, the result corresponding to the executed
command of the USB device; and
provide the result of the transaction request; and
a device-specific driver specific to the USB device,
wherein the computing device executes the first operating
system and the remote system executes a second operating system different from the first operating system,
wherein the remote system is accessible to the computing device using a socket connection, and wherein the
remote system comprising:
a proxy to:
report a status of the USB device to the computing
device;
receive, from the computing device, the transaction
request in a first form compatible with the first operating system;
translate the transaction request from the first form into
a second form compatible with the second operating
system;
receive the result of the transaction request in the second
form;
translate the result of the transaction request from the
second form into the first form; and
provide the translated result in the first form to the computing device; and
a generic device driver native to the second operating
system to:
operate with different USB devices including the USB
device;
assign priorities to the different USB devices based on
data paths;
receive the translated transaction request for the USB
device from the proxy;
control the USB device;
receive the result of the transaction request in the second
form from a device bus driver; and
provide the result of the transaction request in the second
form to the proxy.

10. The computing device of claim 9, wherein the virtual device bus driver accepts transaction requests from other device-specific drivers.

11. The computing device of claim 9, wherein the agent receives identifying information about the USB device from the remote system.

12. The computing device of claim 11, wherein the computing device loads the device-specific driver based on the identifying information about the USB device.

13. The computing device of claim 9, wherein the virtual device bus driver is to:
receive the notification from the agent;
provide the notification to the first operating system;
receive the transaction request from the device-specific driver;
receive the result from the agent; and
provide the result to the device-specific driver,
wherein the agent receives the notification from the remote system, and receives the transaction request from the virtual device bus driver.

14. The computing device of claim 9, wherein the device-specific driver translates a transaction with the USB device to a transaction request understandable by the USB device.

15. The computing device of claim 9, wherein at least one of the transaction request and the result is encrypted.

16. The system of claim 9, wherein the virtual device bus driver is further to wait to receive the result of the at least one transaction request.

17. A method for virtualization of a local device, comprising:
- reporting, using a proxy of a local system, to a remote system, a status of a local device when the local device is physically connected to the local system, the remote system accessible to the local system using a socket connection, wherein the local system executes a first operating system and the remote system executes a second operating system different from the first operating system;
- receiving, using the proxy, at least one transaction request in a second form compatible with the second operating system designated for the local device from the remote system, the at least one transaction request corresponding to a command for the local device;
- translating, using the proxy, the at least one transaction request from the second form into a first form compatible with the first operating system;
- receiving, using a generic device driver of the local system, the at least one translated transaction request from the proxy, wherein the generic device driver is native to the first operating system;
- controlling, using the generic device driver, the local device;
- receiving, using the generic device driver, a result of the at least one transaction request in the first form from a device bus driver, the result of the at least one transaction request corresponding to an executed command of the local device;
- receiving, using the proxy, the result of the at least one transaction request in the first form from the generic device driver
- translating, using the proxy, the result of the at least one transaction request from the first form compatible with the first operating system into the second form that is compatible with the second operating system; and
- transmitting, using the proxy, the translated result in the second form to the remote system,
- wherein the generic device driver operates with different local devices including the local device and assigns priorities to the different local devices based on data paths, and
- wherein the remote system comprises a device-specific driver for the local device.

18. The method of claim 17, wherein the local device is a Universal Serial Bus device.

19. The method of claim 17, further comprising translating the at least one transaction request from the second form compatible with the second operating system into the first form that is compatible with the first operating system.

20. The method of claim 17, wherein the device bus driver is operable with the first operating system and not operable with the second operating system, wherein the device bus driver is operable with a first type of communications protocol, and wherein the local device and a second local device utilize the first type of communications protocol,
- wherein the generic device driver is operable with the first operating system and not operable with the second operating system.

21. The method of claim 17, wherein the status of the local device includes whether the local device is connected to the local system.

22. The method of claim 17, wherein the status of the local device includes identifying information about the local device.

23. The method of claim 17, wherein the local system is a computer comprising a processor, and wherein the remote system comprises a virtual device bus driver, an agent and a processor.

24. The method of claim 17, further comprising encrypting at least one of the at least one transaction request and the result of the at least one transaction request.

25. A method for utilizing a device when the device is connected to a remote system, comprising:
- receiving a notification from a proxy of a remote system that a device is connected to the remote system accessible using a socket connection;
- loading a device-specific driver for the device;
- accepting at least one transaction request using the device-specific driver, the at least one transaction request designated for the device and corresponding to a command for the device;
- executing a first operating system;
- sending the at least one transaction request to the remote system in a first form compatible with the first operating system, wherein the remote system executes a second operating system different from the first operating system;
- receiving, using the proxy, the at least one transaction request in the first form;
- translating, using the proxy, the at least one transaction request from the first form into a second form that is compatible with the second operating system;
- receiving, using a generic device driver of the remote system, the at least one translated transaction request from the proxy, wherein the generic device driver is native to the second operating system;
- controlling, using the generic device driver, the device;
- receiving, using the generic device driver, a result of the at least one transaction request in the second form from a device bus driver, the result of the at least one transaction request corresponding to an executed command of the device;
- receiving, using the proxy, the result of the at least one transaction request in the second form from the generic device driver;
- translating, using the proxy, the result of the at least one transaction request from the second form into the first form;
- transmitting, using the proxy, the translated result in the first form; and
- receiving, from the proxy of the remote system, the result of the at least one transaction request,
- wherein the generic device driver operates with different devices including the device and assigns priorities to the different devices based on data paths.

26. The method of claim 25, wherein the device is a Universal Serial Bus device.

27. The method of claim 25, wherein the remote system is configured to translate the result of the at least one transaction request from the second form compatible with the second operating system into the first form compatible with the first operating system.

28. The method of claim 25, wherein the step of accepting at least one transaction request from the device-specific driver comprises accepting the at least one transaction request using a virtual device bus driver, the virtual device bus driver configured to accept transaction requests from other device-specific drivers.

29. The method of claim 25, further comprising:
receiving identifying information about the device from the remote system.

30. The method of claim 29, wherein the step of loading a device-specific driver for the device connected to the remote system is based on the identifying information about the local device.

31. The method of claim 25, further comprising encrypting at least one of the at least one transaction request and the result of the at least one transaction request.

32. The method of claim 25, further comprising waiting for the result of the at least one transaction request, prior to receiving the result of the at least one transaction request.

33. A non-transitory machine-readable medium encoded with instructions executable by a processor to perform a method for virtualization of a local device, the method comprising:
reporting, using a proxy of a local system, to a remote system, a status of a local device when the local device is physically connected to the local system that includes the processor, the remote system accessible to the local system using a socket connection, wherein the local system executes a first operating system and the remote system executes a second operating system different from the first operating system;
receiving, using the proxy of the local system, at least one transaction request in a second form compatible with the second operating system designated for the local device from the remote system, the at least one transaction request corresponding to a command for the local device;
translating, using the proxy, the at least one transaction request from the second form into a first form compatible with the first operating system;
receiving, using a generic device driver of the local system, the at least one translated transaction request from the proxy, wherein the generic device driver is native to the first operating system;
controlling, using the generic device driver, the local device;
receiving, using the generic device driver, a result of the at least one transaction request in the first form from a device bus driver, the result of the at least one transaction request corresponding to an executed command of the local device;
receiving, using the proxy, the result of the at least one transaction request in the first form from the generic device driver
translating, using the proxy, the result of the at least one transaction request from the first form compatible with the first operating system into the second form that is compatible with the second operating system; and
transmitting, using the proxy, the translated result in the second form to the remote system,
wherein the generic device driver operates with different local devices including the local device and assigns priorities to the different local devices based on data paths, and
wherein the remote system comprises a device-specific driver for the local device.

34. The non-transitory machine-readable medium of claim 33, wherein the local device is a Universal Serial Bus device.

35. The non-transitory machine-readable medium of claim 33, wherein the method further comprises translating the at least one transaction request from the second form compatible with the second operating system into the first form that is compatible with the first operating system.

36. The non-transitory machine-readable medium of claim 33, wherein the device bus driver is operable with the first operating system and not operable with the second operating system, wherein the device bus driver is operable with a first type of communications protocol, and wherein the local device and a second local device utilize the first type of communications protocol,
wherein the generic device driver is operable with the first operating system and not operable with the second operating system.

37. The non-transitory machine-readable medium of claim 33, wherein the status of the local device includes whether the local device is connected to the local system.

38. The non-transitory machine-readable medium of claim 33, wherein the status of the local device includes identifying information about the local device.

39. The non-transitory machine-readable medium of claim 33, wherein the local system is a computer comprising the processor, and wherein the remote system comprises a virtual device bus driver, an agent, and a processor.

40. The non-transitory machine-readable medium of claim 33, wherein the method further comprises encrypting at least one of the at least one transaction request and the result of the at least one transaction request.

41. A non-transitory machine-readable medium encoded with instructions executable by a processor to perform a method for utilizing a device when the device is connected to a remote system, the method comprising:
receiving a notification from a proxy of a remote system that a device is connected to the remote system accessible using a socket connection;
loading a device-specific driver for the device;
accepting at least one transaction request using the device-specific driver, the at least one transaction request designated for the device and corresponding to a command for the device;
executing, using the processor, a first operating system;
sending the at least one transaction request to the remote system in a first form compatible with the first operating system, wherein the remote system executes a second operating system different from the first operating system;
receiving, using the proxy, the at least one transaction request in the first form;
translating, using the proxy, the at least one transaction request from the first form into a second form that is compatible with the second operating system;
receiving, using a generic device driver of the remote system, the at least one translated transaction request from the proxy, wherein the generic device driver is native to the second operating system;
controlling, using the generic device driver, the device;
receiving, using the generic device driver, a result of the at least one transaction request in the second form from a device bus driver, the result of the at least one transaction request corresponding to an executed command of the device;
receiving, using the proxy, the result of the at least one transaction request in the second form from the generic device driver;
translating, using the proxy, the result of the at least one transaction request from the second form into the first form;

transmitting, using the proxy, the translated result in the first form; and receiving, from the proxy of the remote system, the result of the at least one transaction request, wherein the generic device driver operates with different devices including the device and assigns priorities to the different devices based on data paths.

42. The non-transitory machine-readable medium of claim 41, wherein the device is a Universal Serial Bus device.

43. The non-transitory machine-readable medium of claim 41, wherein the remote system is configured to translate the result of at least one transaction request from the second form compatible with the second operating system into the first form compatible with the first operating system.

44. The non-transitory machine-readable medium of claim 41, wherein the step of accepting at least one transaction request from the device-specific driver comprises accepting the at least one transaction request using a virtual device bus driver, the virtual device bus driver configured to accept transaction requests from other device-specific drivers.

45. The non-transitory machine-readable medium of claim 41, wherein the method further comprises:

receiving identifying information about the device from the remote system.

46. The non-transitory machine-readable medium of claim 45, wherein the step of loading a device-specific driver for the device connected to the remote system is based on the identifying information about the local device.

47. The non-transitory machine-readable medium of claim 41, wherein the step of receiving a notification that a device is locally connected to a remote system is performed using an agent, wherein the step of accepting at least one transaction request from the device-specific driver is performed using a virtual device bus driver, wherein the step of receiving, from the remote system, a result of the at least one transaction request is performed using the agent, wherein the step of providing the result of the at least one transaction request to the device-specific driver is performed using the virtual device bus driver, and wherein the method further comprises:

receiving, using the virtual device bus driver, the notification from the agent;

providing, using the virtual device bus driver, the notification to an operating system of the system;

receiving, using the agent, the at least one transaction request from the virtual device bus driver;

receiving, using the virtual device bus driver, the result of the at least one transaction request from the agent.

48. The non-transitory machine-readable medium of claim 41, wherein the method further comprises encrypting at least one of the at least one transaction request and the result of the at least one transaction request.

49. The non-transitory machine-readable medium of claim 41, wherein the method further comprises waiting for the result of the at least one transaction request, prior to receiving the result of the at least one transaction request.

* * * * *